United States Patent
Tomik et al.

(10) Patent No.: US 9,002,569 B2
(45) Date of Patent: Apr. 7, 2015

(54) VEHICLE SHUT-DOWN FUNCTIONALITY FOR PEPS-EQUIPPED VEHICLES

(71) Applicant: Ford Global Technologies, Dearborn, MI (US)

(72) Inventors: Filip Tomik, Commerce Township, MI (US); Kirk Pebley, Novi, MI (US); William David Treharne, Ypsilanti, MI (US); Kevin Thomas Hille, Plymouth, MI (US); Daniel M King, Northville, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/457,010

(22) Filed: Aug. 11, 2014

(65) Prior Publication Data

US 2014/0350825 A1    Nov. 27, 2014

Related U.S. Application Data

(62) Division of application No. 13/230,015, filed on Sep. 12, 2011, now Pat. No. 8,838,325.

(51) Int. Cl.

| | |
|---|---|
| *G01M 17/00* | (2006.01) |
| *B60Q 1/00* | (2006.01) |
| *B60R 25/04* | (2013.01) |
| *B60K 28/04* | (2006.01) |
| *B60R 25/24* | (2013.01) |
| *B60K 28/12* | (2006.01) |
| *B60W 50/00* | (2006.01) |

(52) U.S. Cl.
CPC ............... *B60R 25/04* (2013.01); *B60K 28/04* (2013.01); *B60R 25/24* (2013.01); *B60K 28/12* (2013.01); *B60W 2520/04* (2013.01); *B60W 50/0098* (2013.01)

(58) Field of Classification Search
CPC .......... F02N 11/0803; F02N 2200/022; F02N 11/105; F02N 2200/102; F02N 11/0848; F02N 2200/025; F02N 2200/061; F02N 2200/0801; F02N 2200/0803; F02N 2200/0815; B60R 25/04; B60R 25/24; B60R 21/01516; B60R 22/48; B60R 2022/468
USPC ............... 701/29.6, 30.8, 472, 471, 113, 102; 340/438, 5.31
See application file for complete search history.

(56) References Cited

U.S. PATENT DOCUMENTS

| | | | |
|---|---|---|---|
| 5,635,901 | A | 6/1997 | Weinblatt |
| 5,821,631 | A | 10/1998 | Loraas et al. |

(Continued)

FOREIGN PATENT DOCUMENTS

| | | |
|---|---|---|
| WO | WO 9313968 A1 | 7/1993 |
| WO | WO 2005088561 A2 | 9/2005 |

OTHER PUBLICATIONS

Aur'Elien Francillon, Boris Danev, Srdjan Capkun; Relay Attacks on Passive Keyless Entry and Start Systems in Modern Cars; Department of Computer Science, ETH Zurich http://eprint.iacr.org/2010/332.pdf.

*Primary Examiner* — Muhammad Shafi

(74) *Attorney, Agent, or Firm* — Angela M. Brunetti; David Kelley

(57) ABSTRACT

A vehicle comprises a plurality of control module structures. A first control module structure is configured for determining a current motive mode of the vehicle. A second control module structure is configured for determining information indicating that a driver of the vehicle has left the vehicle unattended while the vehicle is in a motive-enabled mode. A third control module structure is configured for causing a secure idle mode to be implemented as a function of determining the information indicating that the driver of the vehicle has left the vehicle unattended while the vehicle is in the motive-enabled mode. Implementing the secure idle mode can include inhibiting the vehicle from being driveable until a driver access code is successfully received and authenticated by the vehicle.

6 Claims, 4 Drawing Sheets

(56) References Cited

U.S. PATENT DOCUMENTS

2006/0129299 A1* 6/2006 Schmidt .......................... 701/71
2006/0238300 A1* 10/2006 Ohtaki et al. ................. 340/5.72
2013/0079952 A1* 3/2013 Fazi ................................. 701/2

* cited by examiner

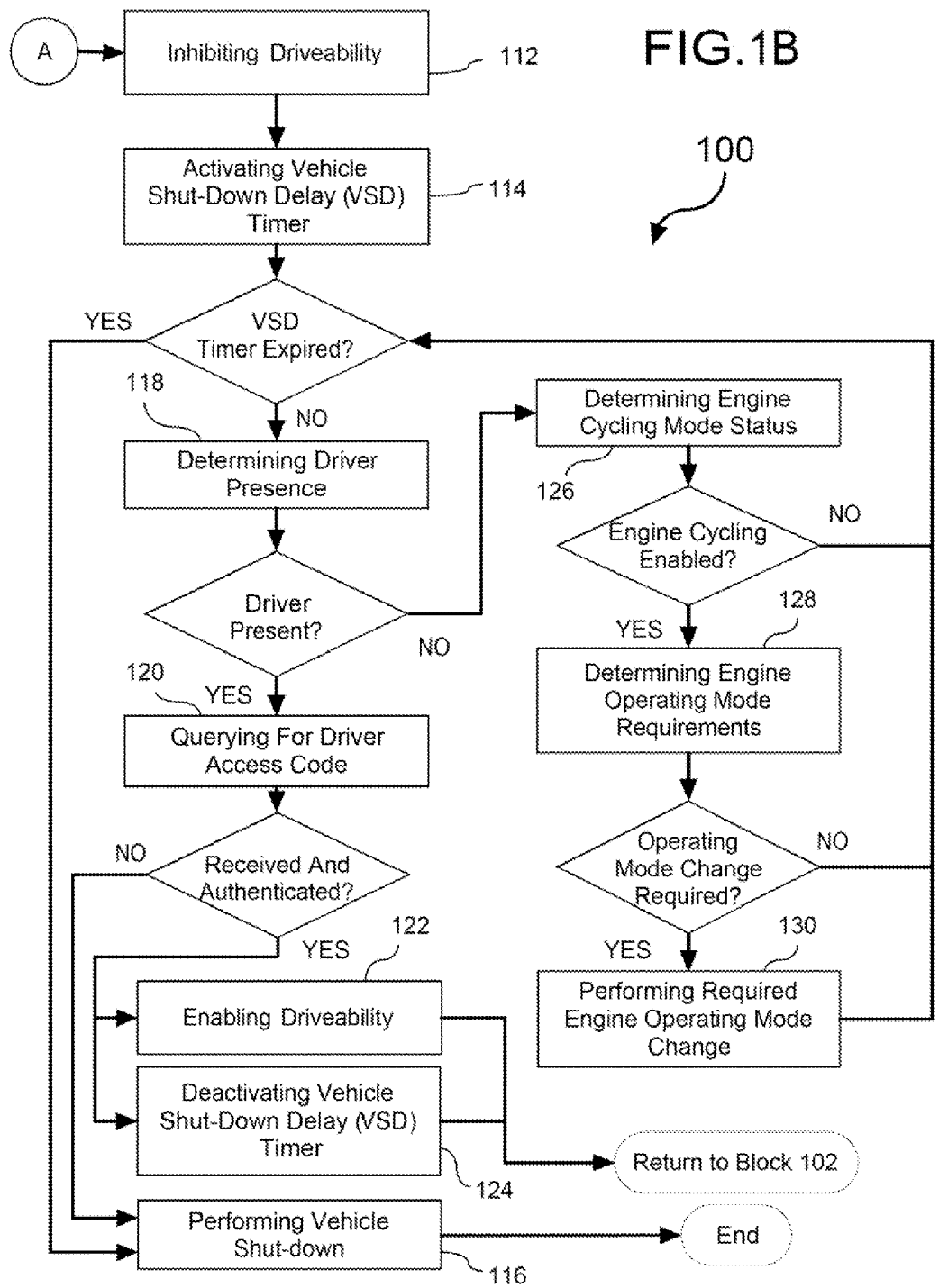

VEHICLE SHUT-DOWN FUNCTIONALITY FOR PEPS-EQUIPPED VEHICLES

CROSS REFERENCE TO RELATED APPLICATIONS

This application is a divisional of U.S. application Ser. No. 13/230,015, titled "Vehicle Shut-down Functionality for PEPS-Equipped Vehicles", now allowed filed on Sep. 12, 2011 incorporated by reference herein.

FIELD OF THE DISCLOSURE

The disclosures made herein relate generally to systems for providing vehicle security and, more particularly, to vehicle shutdown functionality for vehicles equipped with passive entry/passive start (PEPS) technology.

BACKGROUND

Vehicles that have a conventional ignition key arrangement are well known. They are commonly referred to as conventional ignition key vehicles. Such a conventional ignition key vehicle has a physical key that engages a mating ignition switch for allowing selective and secure control of the vehicle's powertrain activation function (e.g., electrical system actuation, engine starting, etc) and accessory function (allowing certain accessories to be operated without engine running). With regard to a conventional ignition key vehicle, in order for a vehicle driver to leave the vehicle with the key, the vehicle driver must physically use the key to turn the vehicle off to allow the key to be released from the ignition switch. Even in the case where the conventional ignition key includes a transponder that is read and authenticated for enabling vehicle operation in response to the ignition switch being moved from an off position to a position that enables vehicle operation, the need to turn the vehicle off with the key to release the key from the ignition switch considerably reduces the likeliness that the vehicle driver will unintentionally leave the vehicle with its engine running or its electric powertrain system in an active mode.

However, with passive entry/passive start (PEPS) technology, a transponder (i.e., a PEPS transponder) wirelessly communicates with a correspond in control module (i.e., a PEPS control module). The transponder provides a unique authorization code to the PEPS control module thereby enabling normal operation of the vehicle (e.g., the vehicle to be started and driven). Through one or more types of proximity sensing technologies (e.g., an perimeter antenna curtain), the vehicle is able to determine if the transponder is located within an interior space of the vehicle (e.g., the cabin, trunk, etc). The conventional approach for shutting down a PEPS-equipped vehicle involves an action that is not dependent upon an article into which the transponder is integrated (e.g., a key fob). For example, vehicle shut-down can require depressing a stop button. Thus, unlike a conventional ignition key with a transponder for enabling authenticated vehicle operation, shut down on a PEPS-equipped vehicle is not dependent upon there being a physical connection between the vehicle and the article into which the transponder is integrated.

Because the transponder does not rely on a physical connection between it and the vehicle, a driver of a PEPS-equipped vehicle is able to intentionally or unintentionally exit the vehicle with the passive transponder in their possession while the vehicle is still in a motive-enabled mode (e.g., engine running and/or auto stopped, or electric powertrain in active state with all/certain accessories operable). It can be seen that, unlike conventional ignition key vehicles, PEPS-equipped vehicles are subject an increased possibility of a vehicle driver unintentionally leaving the vehicle in the motive-enabled mode. Motive mode within the context of the disclosures made herein refers to the vehicle being in a state where the engine or electric powertrain systems are capable of having their output power used for propelling the vehicle in a forward or rearward direction (e.g., used lot providing a tractive force at wheels of the vehicle). Unintentionally leaving the vehicle in the motive-enabled mode or accessory-enabled mode can cause the vehicle to potentially run out of engine fuel due to the engine idling for an excessive period of engine time, can cause the vehicle to drain a battery unit due to the electrical system being activated for an excessive period of time, and/or can lead to an unauthorized driveway (e.g., theft) condition as a result of a vehicle immobilizer being disarmed while the vehicle is in the motive-enabled mode. Known PEPS implementations do not offer security and convenience of operation beyond traditional human/machine interface (HMI) messaging or warning chimes to notify a vehicle driver that they are leaving the vehicle in a state that can lead to theft of the vehicle or the vehicle ultimately leaving the vehicle driver stranded In addition to the abovementioned problems that can arise from implementation of PEPS technology, these problems can be further magnified in hybrid electric vehicles (HEV) and battery electric vehicles (BEV) when Stop Start (SS) technology is also implemented. SS technology refers to an internal combustion being automatically shut off and restarted (e.g., at a stop-light), which saves fuel and reduces emissions. The reason SS technology further contributes to the abovementioned problems is because engine idling reminders (e.g., noise and vibration), which are present in vehicles that are not equipped with SS technology, are no longer present in a SS-equipped vehicle when the engine is in the shut off state during an SS instance.

Therefore, implementing PEPS functionality in a manner that overcomes drawbacks associated with conventional implementations of vehicle control strategies for PEPS-equipped vehicles and, optionally, SS-equipped vehicles would be advantageous, desirable and useful.

SUMMARY OF THE DISCLOSURE

Embodiments of the present invention provide fur implementing vehicle control strategies in a manner that overcomes drawbacks associated with conventional implementations of PEPS technology. More specifically, embodiments of the present invention provide for driveability of a vehicle to be inhibited as a function of determining indications that a driver of the vehicle has unintentionally left the vehicle with the PEPS transponder (e.g., passive transponder embodied as a key fob) in their possession while the vehicle is still in a motive-enabled mode and thereafter, can shut down the vehicle as a function of continued indications that the driver of the vehicle has not returned to the vehicle with the PEPS transponder. In doing so, such vehicles advantageously have a reduced likeliness of running out of engine fuel due to the engine idling for an excessive period of engine time, having a discharged battery unit thereof due to the electrical system being activated for an excessive period of time, and/or being subject to an unauthorized driveway condition resulting from a vehicle immobilizer being disarmed while the vehicle is in the motive-enabled mode.

In one embodiment of the present invention, a method comprises a plurality of operations. An operation is performed for determining an indication that a driver of a vehicle has left the vehicle unattended while the vehicle is in a motive-enabled mode. An operation is performed for changing the vehicle from the motive-enabled mode to a secure idle mode as a function of determining the indication that the driver of the vehicle has left the vehicle unattended while the vehicle is in the motive-enabled mode.

In another embodiment of the present invention, a non-transitory computer-readable medium has tangibly embodied thereon and accessible therefrom a set of instructions interpretable by at least one data processing device. The set of instructions is configured for causing the at least one data processing device to carry out operations for determining an indication that a driver of a vehicle has left the vehicle unattended while the vehicle is in a motive-enabled mode and for changing the vehicle from the motive-enabled mode to a secure idle mode as a function of determining the indication that the driver of the vehicle has left the vehicle unattended while the vehicle is in the motive-enabled mode.

In another embodiment of the present invention, a vehicle comprises a plurality of control module structures. A first control module structure is configured for determining a current motive mode of the vehicle. A second control module structure is configured for determining information indicating that a driver of the vehicle has left the vehicle unattended while the vehicle is in a motive-enabled mode. A third control module structure is configured for causing a secure idle mode to be implemented as a function of determining the information indicating that the driver of the vehicle has left the vehicle unattended while the vehicle is in the motive-enabled mode.

These and other objects, embodiments, advantages and/or distinctions of the present invention will become readily apparent upon further review of the following specification, associated drawings and appended claims.

BRIEF DESCRIPTION OF THE DRAWINGS

FIGS. 1A and 1B shows as method for implementing vehicle control strategies in accordance with an embodiment of the present invention.

DETAILED DESCRIPTION OF THE DRAWING FIGURES

Figure 1A:
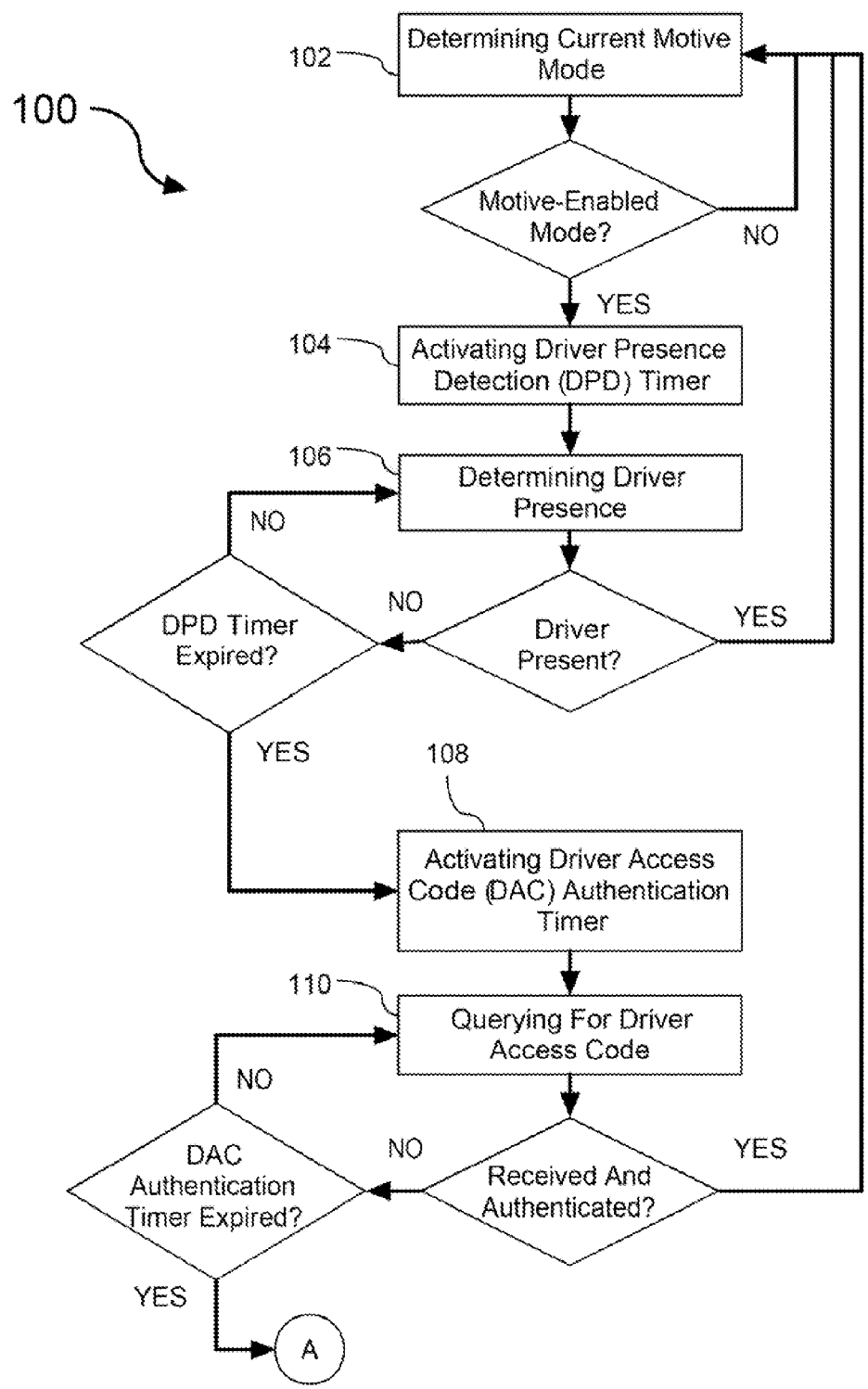

In a vehicle with passive entry/pass start (PEPS), a driver can intentionally or unintentionally leave the vehicle unattended with a PEPS transponder of the vehicle in their possession while the vehicle is still in the motive-enabled mode with the engine of the vehicle running or in the motive-mode with the engine not running. In the motive-enabled mode with the engine running, which is the normal mode of the vehicle when either driving or sitting stationary in gear or in park, the vehicle can be driven away without needing authentication of the vehicle's passive key. In the motive-enabled mode with the engine not running, which applies to start-stop vehicles, hybrid vehicles, and plug-in hybrid vehicles, the engine is turned off when not needed to be used to provide to propel the vehicle or to provide electrical power, heat, or air conditioning, but the vehicle can be driven away without needing authentication of the vehicle's passive key. Because such as vehicle is quieter without the engine running, the vehicle driver may leave the vehicle in the motive-enabled mode with the engine not running more often than if the engine is running. For a battery electric vehicle (BEV) without an engine, this case is always true. Accordingly, while a vehicle is left unattended when in the motive-enabled mode, the vehicle is subject to, running out of engine fuel due to the engine idling for an excessive period of engine time, to causing the vehicle to drain a battery unit thereof due to the electrical system being activated for an excessive period of time, and/or to unauthorized driveway resulting from a vehicle immobilizer being disarmed.

Advantageously, embodiments of the present invention provide for implementation of vehicle control strategies (e.g., PEPS vehicle control strategies) that at least partially alleviate the abovementioned undesirable situations that can arise from leaving as vehicle unattended while in the motive-enabled mode. These vehicle control strategies involve transitioning the vehicle from the motive-enabled mode to a secure idle mode. In the secure idle mode, driveability of the vehicle is inhibited. while certain other operations of the vehicle remain active (e.g., accessory item functionality, climate control functionality, etc). However, while in the secure idle mode, a driver access code (e.g., from the PEPS transponder) must be received and authenticated for permitting the vehicle to be driven. If an attempt is made to drive the vehicle without such driver access code authentication while the vehicle is in the secure idle mode, the vehicle is automatically shut down (e.g., as if an ignition had been turned to an off position or a stop button had been pressed) and thereafter requires that the driver access code be successfully received and authenticated in order for the vehicle to be correspondingly transitioned back to the motive-enabled mode. In this regard, transitioning the vehicle from the motive-enabled mode to the secure idle mode provides for secure operation of the vehicle when it is determined that the driver has left the vehicle unattended with the PEPS transponder of the vehicle in their possession while the vehicle is still in the motive-enabled mode. As discussed below in greater detail, while the vehicle is in the secure idle mode, operation of an engine of the vehicle can optionally be changed as needed to maintain or achieve a certain vehicle operating function (e.g., a battery state of charge, a climate control level, a reduced rate of fuel consumption, etc).

It is disclosed herein that the term "secure idle" refers to a vehicle being idle rather than an engine of the vehicle idling. Accordingly, in the case of a vehicle with an engine that runs at idle, the engine may or may not be running when the vehicle is transitioned to the secure idle mode. Similarly, in the case of a vehicle having an engine that is never idling when the vehicle is sitting idle (or a vehicle without an engine), the engine is never idling when the vehicle is transitioned to the secure idle mode. In this regard, a vehicle is in a motive-disabled state (i.e., driveability is inhibited) when it is in the secure idle mode.

Referring now to FIGS. 1A and 1B, a method 100 for implementing vehicle control strategies in accordance with an embodiment of the present invention is shown. An operation 102 is performed for determining a current motive mode of a vehicle. This operation can be continuously, intermittently, or periodically performed until it is determined that the vehicle is in the motive-enabled mode. In response to determining that the vehicle is in the motive-enabled mode, an operation 104 for activating (e.g., initializing, resetting, starting, etc) a driver presence detection (DPD) timer is performed in conjunction with (e.g., in series as shown or in parallel) an operation 106 for determining presence of a driver of the vehicle (i.e., the vehicle driver). As discussed below in greater detail, in a preferred embodiment of the present invention, determining driver presence can include determining that the vehicle is stationary, determining that a driver-door of the vehicle has been in an open configuration for a defined period of time since determining that the vehicle is stationary, and determining that driver inputs have been detected since determining that the vehicle is stationary. However, the present invention is not unnecessarily limited to any particular means for determining presence of the vehicle driver. For example, presence of the vehicle driver can be determined using one or more driver input sensors, using a visual imaging apparatus (e.g., a camera), using a pressure sensor in the driver seat, and the like. The driver presence timer, which can have a duration of zero or greater than zero, can allow for a period of time over which one or more attempts are made to determine if vehicle driver is present. For example, the driver may be sitting within the car while stationary and in the motive-enabled mode, open the door for a suitably long period of time without getting out of the car and without making any driver inputs (e.g., at the steering wheel, brake pedal, accelerator pedal, etc. Thereafter, prior to the driver presence detection timer expiring, the driver then performs an act that results in the vehicle determining that the driver is present within the vehicle.

Jointly, determining the current motive mode for the vehicle and determining presence of the vehicle driver provide for determining if the vehicle driver has left the vehicle unattended while the vehicle is in the motive-enabled mode. If it is determined that the vehicle driver has not left the vehicle unattended while the vehicle is still in a motive-enabled mode, the method 100 continues at the operation 102 for determining if the current motive mode of the vehicle. If it is determined, that the vehicle driver has left the vehicle unattended while the vehicle is still in the motive-enabled mode and the driver presence timer has expired (e.g., defined duration of time has elapsed, timer counts down to zero, etc), an operation 108 for activating a driver access code (DAC) authentication timer is performed in conjunction with (e.g., in series as shown or in parallel) an operation 110 for querying for a driver access code. It is disclosed herein that the operation for determining the current motive mod and the operation for determining driver presence can be performed in parallel and that such operations can be performed as monitoring operations each according to a respective frequency).

The driver access code authentication timer, which can have a duration of zero or greater than zero, can allow for a period of time over which one or more attempts are made to determine if driver access code is successfully received and authenticated. For example, the driver access code authentication timer can be used to reduce the potential for inadvertently disabling driveability of the vehicle due to the PEPS transponder having been located somewhere in the vehicle but in a manner that is temporarily prevented from being read by the vehicle (e.g., location in a purse with a lot of metal inside, which his interfering with the vehicle communicating with the PEPS transponder.) A keyfob having the PEPS transponder integral therewith is one example of a device con figured for wirelessly transmitting (i.e., means for providing) a driver access code to the vehicle. Other examples of means for providing the driver access code to the Vehicle include, but are not limited to, entering the drive access code into a provided device (e.g., a keypad), entering biometric information into a corresponding reader, and the like.

If it is determined that the driver access code has been successfully received and authenticated, the method 100 continues at the operation 102 for determining the current motive mode of the vehicle. If it is determined that the driver access code has not been successfully received and authenticated and that the driver access code authentication timer has expired, an operation 112 for inhibiting driveability of the vehicle is performed, followed by an operation 114 being performed for activating a vehicle shut-down delay timer (see FIG. 1B). In the context of the present invention, inhibiting driveability refers to not allowing the vehicle to be driven by a driver until the driver access code is successfully received and authenticated by the vehicle. Thus, in the broadest sense, inhibiting driveability precludes one or more vehicle operations that are required En allowing a power-generating apparatus of the vehicle (e.g., an engine and/or a motor system) to propel the vehicle and/or precludes one or more driver input devices (e.g., steering wheel, accelerator pedal, gear selector, etc) from being operable. It is disclosed herein that inhibiting driveability of the vehicle can be affected electronically (e.g., via inhibiting signal output at one or more control modules/computers) and/or electro-mechanically (e.g., engagement of a movement inhibiting actuator with a respective driver input device). It is further disclosed that the present invention is not unnecessarily limited to any one or more of these ways. In one embodiment of inhibiting driveability of the vehicle, output power from an engine and/or motor unit is inhibited from being provided to respective vehicle propelling components of a drivetrain of the vehicle and at least one driver input device in made inoperable. In this regard, changing the vehicle from the motive-enabled mode to a secure idle mode includes inhibiting driveability of the vehicle and requiring the driver access code to be received and authenticated by the vehicle prior to enabling the vehicle to be driven. The vehicle shut-down delay timer, which can optionally be omitted or have its duration set to infinity, can allow for a period of time over which one or more attempts are made to determine if the driver is present and, if so, for allowing the driver access code to be successfully received and authenticated prior to shutting-down the vehicle.

If the vehicle shut-down delay timer has expired (i.e., including if it is set to zero), an operation 116 is performed for shutting down the vehicle. Shutting down the vehicle refers to transitioning the vehicle to the same state as if the driver had pressed a start/stop button of the vehicle and/or turned an ignition switch to an off position. In the example where an engine of the vehicle was running at the time vehicle shut-down was initiated (i.e., providing the vehicle has an engine), performing vehicle shut-down would include the engine being stopped, applicable engine control modules being shut-down (e.g., ceasing of all operations thereof), and the vehicle ignition system being shutdown (e.g., inhibiting electrical power therethrough to vehicle operating systems/components/accessories). In the example where the vehicle engine was not running at the time vehicle shut-down was initiated, performing vehicle shut-down would include applicable control modules of the vehicle being shutdown and the vehicle ignition system being shutdown.

If the vehicle shut-down delay timer has not yet expired, an operation 118 is performed for determining driver presence. The operation 118 for determining driver presence is preferably, but not necessarily, performed in the same manner as the operation 106 for determining driver presence in FIG. 1A. If it is determined that the driver is present, an operation 120 is performed for querying for the driver access code. The operation 120 for querying for the driver access code is preferably, but not necessarily, performed in the same manner as the operation 110 for querying for the driver access code in FIG. 1A. If the driver access code is not successfully received and authenticated, the operation 116 is performed for performing vehicle shut-down. If, however, the driver access code is successfully received and authenticated, an operation 122 is performed for enabling driveability of the vehicle (e.g., reversing and/or discontinuing activities/functionalities that inhibited driveability at the operation 112 and, if necessary, an operation 124 can be performed for deactivating the vehicle shut-down delay timer. From the disclosures made herein, a skilled person will appreciate that the operations for determining if the vehicle driver has left the vehicle unattended while the vehicle is in the motive-enabled mode, inhibiting driveability, determining driver presence, enabling driveability, and performing vehicle shut-down jointly define an embodiment of implementing secure idle functionality in accordance with the present invention.

If determining driver presence at the operation 118 leads to a determination that the driver is not present, an operation 126 is performed for determining status of an engine cycling mode of the vehicle. For example, a PEPS control module and/or main control module of the vehicle can be configured to allow the engine cycling mode to be selectively enabled and disabled. The engine cycling mode allows the engine to be selectively operated (e.g., idled), as necessary, while the vehicle is in the secure idle mode. As shown, engine cycling mode can be in an enabled state or disabled state. If the engine cycling mode is in the disabled state (e.g., selectively disabled or, permanently disable, not an available option on the vehicle, etc), the method 100 proceeds with assessing the vehicle shot-down delay timer and subsequently shutting down the vehicle at the operation 116 if the vehicle shut-down delay timer has expired or determining driver presence at the operation 118 if the vehicle shut-down delay timer has not expired. If the engine cycling mode is in an enabled state, an operation 128 is performed for determining whether a current vehicle operating condition necessitates a change in the current engine operating mode. If it is determined that the current vehicle operating condition does not necessitate a change in the current engine operating mode, the method 100 proceeds with assessing the vehicle shut-down delay timer and subsequently shutting down the vehicle at the operation 116 if the vehicle shut-down delay timer has expired or determining driver presence at the operation 118 if the vehicle shut-down delay timer has not expired. Otherwise, an operation 130 is performed for implementing the required change in the current engine operating mode and thereafter the method 100 proceeds with assessing the vehicle shut-down delay timer.

Examples of engine cycling parameters utilized for determining whether or not the current vehicle operating condition does or does not necessitate a change in the current engine operating mode include, but are not limited to, a state of charge of a vehicle battery (e.g., motor system battery and/or accessory system battery), a temperature of a cabin of the vehicle, and a temperature of coolant within a cooling system of the vehicle. It is disclosed herein that, in certain embodiments of the present invention, determining whether the current vehicle operating condition necessitates a change in the current engine operating mode can also include determining if such change is permitted. Examples of engine cycling parameters utilized for determining that cycling of the engine is permitted include, but are not limited to, a current location of the vehicle (e.g., in an outdoor location or open parking structure), the engine having already been cycled between the running state and the non-running state for fewer than a prescribed number of allowed cycles, the engine having been run for less than a prescribed maximum run time as at function of such engine cycling, and more than a minimum prescribed level of fuel being indicated as being within a fuel tank of the vehicle. Examples of implementing required engine operating mode changes include, but are not limited to, transitioning the engine of the vehicle from a non-running state to a running state (e.g., to affect a state of charge of a vehicle battery and/or to affect a temperature within the cabin of the vehicle), transitioning the engine, of the vehicle from a running state to a non-running state (e.g., due to no battery state of charge needs and/or no cabin climate control needs), shedding an alternator load from the engine while the engine is in the running state (e.g., to affect as temperature within the cabin of the vehicle but where there are currently needs relating to the battery state of charge).

It is disclosed herein that the engine cycling mode functionality disclosed above(i.e., blocks 126, 128, 130) is an optional functionality and, thus, can be omitted in certain embodiments of the present invention. For example, in a battery electric vehicle, a method for implementing vehicle control strategies in accordance with an embodiment of the present invention would omit the operations providing for engine cycling mode functionality. In such embodiments, a determination that a driver of the vehicle is not present would cause the method to return to the operation for determining driver presence that led to such determination or, if a vehicle shut-down delay timer is active, to checking if the vehicle shut-down delay timer has expired.

EXAMPLE

Hybrid Electric Vehicle With Secure Idle Mode Capability

A hybrid electric vehicle has a powerpack that includes an engine and an electric motor system. The engine runs on petrol fuel and the motor system is powered by electricity from a battery unit. Power generated through operation of the engine can be used for propelling the vehicle, for operating a battery charging system for maintaining the battery at a suitable state of charge, and/or for operating climate control systems of the vehicle.

The vehicle has a PEPS system, which authenticates a driver access code of a passive transponder and, thereafter, enables the vehicle to be started and driven. The passive transponder wirelessly communicates with the vehicle for providing the driver access code. As such, it is not necessary for the wireless transponder to be physically engaged with an ignition switch or other physical structure of the vehicle. As a result, while in a hurry and distracted, the vehicle driver has failed to manually power-down the vehicle before leaving the vehicle thereby leaving the vehicle in a motive enabled mode (i.e., non-engine running motive-enabled mode) such that a subsequent passive transponder read not being required to enable the vehicle to be driven away. Accordingly, while in this motive-enabled mode, the vehicle can be driven away after the vehicle driver leaves the vehicle with the passive transponder in their possession.

The vehicle is equipped with vehicle operating strategies in accordance with the present invention. Through a signal from the driver door switch and driver input devices and after a period of time since not receiving a response to a driver access code query, assessment of available information by the vehicle indicates that the vehicle driver has left the vehicle unattended while in the motive-enabled mode. In response, the vehicle causes its drive ability to be inhibited. In conjunction with inhibiting driveability, for a defined duration of time, the vehicle attempts to ascertain whether or not the driver is in fact still in the vehicle and communication between the PEPS system and the passive transponder is being impeded in some manner. After the defined duration of time elapses the vehicle successfully determining that the driver is present and that the driver access code being successfully received and authenticated, the vehicle implements actions for the shutting down the applicable control modules of the vehicle, and shutting down the ignition of the vehicle.

* * *

Figure 2:
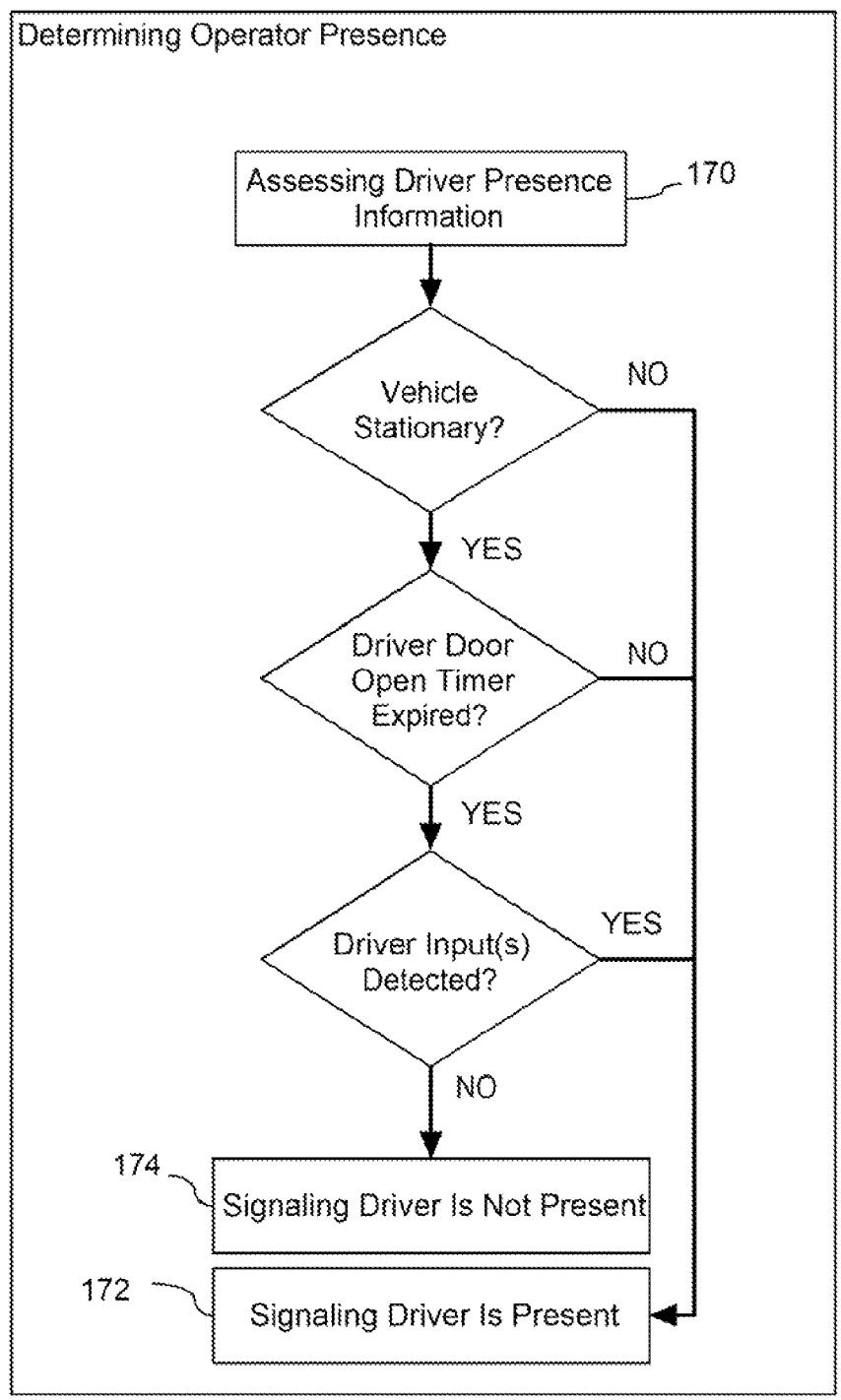
FIG. 2 shows an operation for determining driver presence in accordance with an embodiment of the present invention.

Referring now to FIG. 2, an embodiment of determining driver presence in accordance with the present invention is shown. An operation 170 is performed for assessing driver presence information. In response to determining that the vehicle is not stationary (e.g., via a global positioning system and or wheel speed sensor), that a driver door of the vehicle has not been in an open configuration for at Last a defined period of time since determining that the vehicle is stationary (e.g., via a driver door position switch/sensor) and/or that driver input has been detected at one or more driver input devices of the vehicle, an operation 172 is performed for signalling (e.g., to an appropriate control module computer of the vehicle) that the driver is present in the vehicle. Otherwise, in response to determining that the vehicle is stationary, that as driver door of the vehicle has been in an open configuration for at least the defined period of time since determining that the vehicle is stationary, and that driver input has not been detected at one or more driver input devices of the vehicle, an operation 174 is performed for signalling that the likelihood of driver being present in the vehicle is low. Accordingly, examples of driver presence information include. but are not limited to, information indicating whether or not a vehicle is stationary (e.g., via a global positioning system and/or wheel speed sensor), information indicating whether or not a driver door of the vehicle has been in an open configuration for at least a defined period of time since determining that the vehicle is stationary (e.g., via a driver door position switch/sensor), and information indicating whether or not driver input has been detected at one or more driver input devices of the vehicle. Examples of devices for detecting driver input include, but are not limited to, a brake pedal switch, an accelerator pedal sensor, as steering wheel sensor, a gear shift selector sensor, a driver seat occupancy sensor, a seatbelt extraction sensor, and the like.

Figure 3:
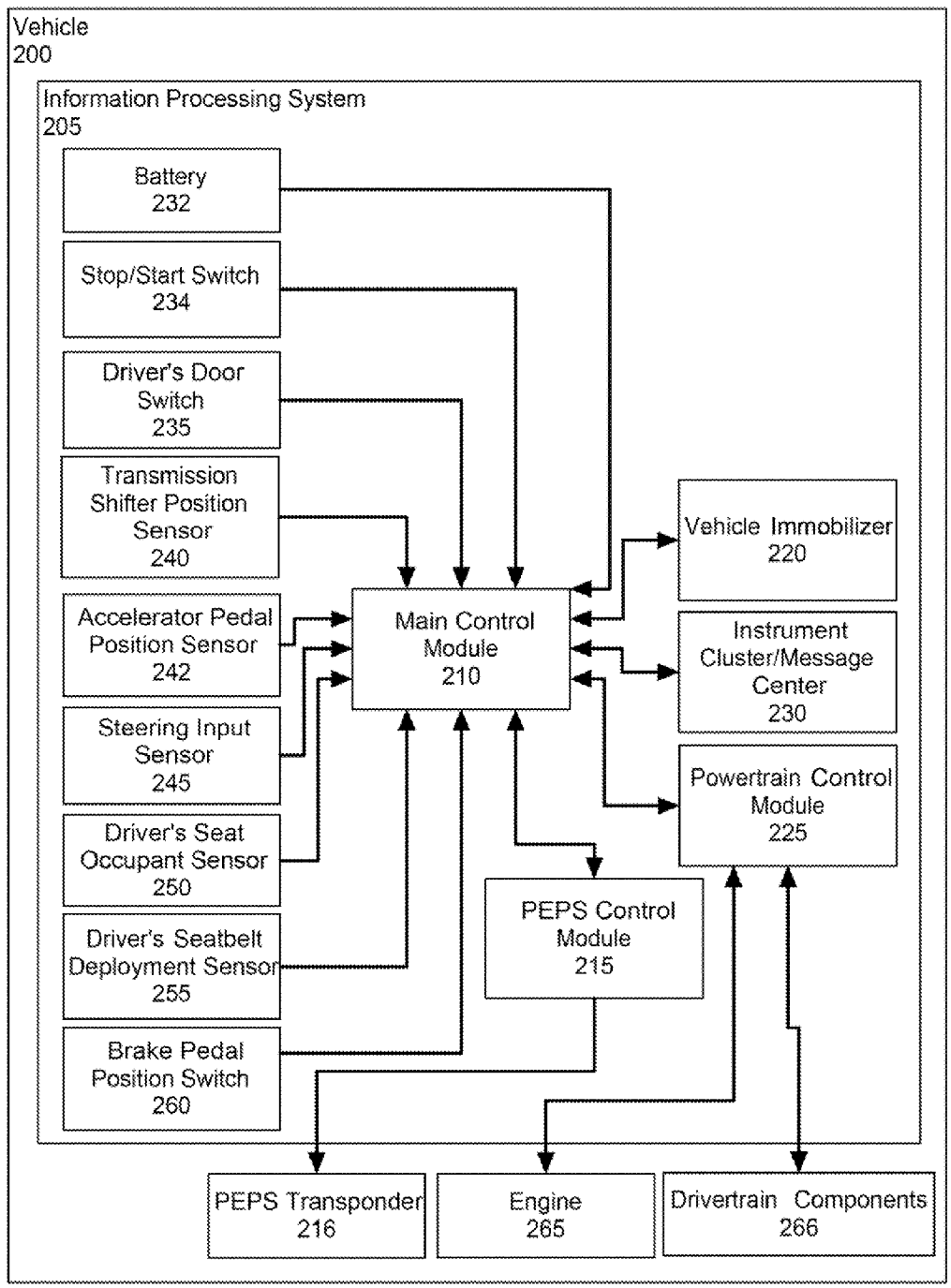
FIG. 3 shows a vehicle having an information processing system that is configured for implementing vehicle control strategies in accordance with embodiments of the present invention.

FIG. 3 shows a vehicle 200 having an information processing system 205. The formation processing system 205 is configured for implementing vehicle control strategies in accordance with embodiments of the present invention. For example, in one embodiment, the information processing system 205 is configured for carrying out the vehicle control strategies discussed above in reference to FIGS. 1A and 1B. To this end, the information processing system 205 includes a plurality of interconnected system elements that are each capable of outputting a respective signal(s), receiving one or more signals from one or more of the arrangement elements, processing vehicle operating information as a function of one or more of such signals, and/or providing input/output functionality for human-machine interface (HMI) information.

The information processing system 205 includes a main control module 210, a PEPS control module 215, a vehicle immobilizer control module 220, an powertrain module 225, an instrument cluster/message center 230, a battery 232, a start/stop switch 234, a driver's door switch 235, a transmission shifter position sensor 240, an accelerator pedal position sensor 242, a steering input sensor 245, a driver's seat pressure sensor 250, a driver's seatbelt deployment sensor 255, and a brake pedal position switch 260. For enabling communication of information signals therebetween, the main control module 210 is connected to the PEPS control module 215, the vehicle immobilizer control module 220, the powertrain module 225, the instrument cluster/message center 230, the battery 232, the start/stop switch 234, the driver's door switch 235, the transmission shifter position sensor 240, the accelerator pedal position sensor 242, the steering input sensor 245, the driver's seat pressure sensor 250, the driver's seatbelt deployment sensor 255, and the brake pedal position switch 260. It is disclosed herein that each one of the control modules can include came or more data processing devices, memory coupled to such data processing device(s), and instructions that are accessible from such memory and are processible by the one or more data processing devices. The instructions of at least one of the control modules is configured for carrying out vehicle control strategies in accordance with an embodiment of the present invention. It as also disclosed herein, that in certain embodiments of the information professing system 205, certain ones of the control modules can be considered to be computers depending upon a definition upon which a computer is defined. Furthermore, although not specifically shown, it is disclosed and contemplated herein that the information processing system 205 can include one or more sensors, switches, and/or control modules that are not shown but which support a respective aspect of an embodiment of the present invention.

The main control module 210 is configured for implementing vehicle control strategies in accordance with an embodiment of the present invention. In a preferred embodiment, the main controller 210 is configured for causing the operations of the method 100 discussed above in reference to FIGS. 1A and 1B to be carried out. To this end, the main control module 210 can include a first control module structure configured for determining a current motive mode of the vehicle, a second control module structure configured for determining information indicating that a driver of the vehicle has left the vehicle unattended while the vehicle is in a motive-enabled mode, and a third control module structure configured for cursing a secure idle mode to be implemented as a function of determining the information indicating that the driver of the vehicle has left the vehicle unattended while the vehicle is in the motive-enabled mode. Each one of these control module structures can be tangibly embodied as respective portions of circuitry of the main control module (e.g., input/output interfaces, portions of instructions, thereof, portions of memory thereof, portions of data processing capabilities thereof, etc). It is also disclosed herein that the mom controller 210 can be a single electronic control module unit or can include a plurality of discrete interconnected electronic control module units.

With regard to instructions processible by a data processing device (e.g., those processed by the main control module 210), it will be understood from the disclosures made herein that methods, processes and/or operations configured for carrying out vehicle control strategies as disclosed herein (e.g., secure idle mode functionality, engine cycling mode functionality, etc) are tangibly embodied by non-transitory computer readable medium having instructions thereon that are configured for carrying out such functionality. In one specific embodiment, the instructions are tangibly embodied for carrying out the method 100 discussed above in reference to FIGS. 1A and 1B. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out vehicle control strategies in accordance with the present invention.

The PEPS control module 215 is configured for detecting the presence of a transponder 216 and authenticating a driver access code that is provided to the PEPS control module 215 by the transponder 216. Furthermore, in certain embodiments of the present invention, the PEPS control module 215 receives transponder read requests from the main control 210 when it is necessary to determine driver presence within the vehicle 200. In one embodiment, the transponder 216 is a passive transponder tangibly embodied as a key fob. Information corresponding to the successful or unsuccessful detection of the transponder and/or authentication of the driver access code is provided to the main controller 210. One or more antenna units (e.g., a curtain antenna unit) can be connected to the PEPS control module 215 for allowing signals to be wirelessly transmitted from the PEPS control module 215 (e.g., transponder query signal) and received by the PEPS controller 215 (e.g., transponder response signal). For example, an interior PEPS antenna is preferably coupled to the PEPS control module 215 for determining whether or not the transponder 216 is inside a cabin or, optionally, trunk of the vehicle 200.

The vehicle immobilizer 220 is an electronic theft protection system that can inhibit the vehicle 200 from being able to be driven. To this end, in a preferred embodiments of the present invention, the vehicle immobilizer 220 can inhibit an engine 265 from being able to be started until information confirming that the driver access code has been successfully received and authenticated (e.g., by the PEPS control module 215). The vehicle immobilizer 220 can also disable the engine 265 and/or a drivetrain 266 (e.g., consisting of electric motors or other machines) from providing wheel torque to be able to move the vehicle 200. Accordingly, the vehicle immobilizer 220 can be configured ha permitting the engine 265 to start and perform functions for charging, heating, and other climate functions (A/C) but not form functions necessary for propelling the vehicle 200. The vehicle immobilizer 220 can be configured to receive information from an electronic encoded device that has been programmed or authorized to enable the vehicle 200 to provide traction functions (i.e., to be able to driven). In certain embodiments, the electronic encoded device is tangibly embodied as a physical key or, in conjunction with a PEPS system, can be tangibly embodied as a transponder in the form of a key fob. As has been previously mentioned, the driver access code can be provided by means such as, for example, a biometric reader (e.g., fingerprint reader) and keypad for allowing the driver access code to be manually keyed, etc.

The powertrain control module 225 is configured for controlling, operation of the engine 265 and, optionally, operation of power transmission components such as, for example, the transmission, the differential(s), the transaxle, etc (i.e., drivetrain components 266). In an embodiment where the vehicle 200 is a hybrid electric or plug in electric vehicle, the powertrain control module 225 can control both an engine of the vehicle 200 and a hybrid electric system of the vehicle 200. In an embodiment where the vehicle 200 is an electric only vehicle, the powertrain control module would control the electric powerpack system (e.g., vehicle propulsion motor(s), battery unit(s) providing power to the motors, transmission elements coupled to the motor(s), etc) of the vehicle 200. In the case of the electric only vehicle, it is disclosed herein that all or certain portions of the electric powerpack system can be a portion of the drivetrain components 266 and the engine 265 would be omitted. In the event that there is an attempt to drive the vehicle 200 when in the secure idle mode, the vehicle immobilizer 220, the main controller 210, and the powertrain controller 225 will jointly cause actions to be implemented for inhibiting the vehicle 200 from being driven (e.g., will shut off the engine and/or the electric drive system).

The instrument cluster/message center 230 includes a graphical display that can provide the vehicle driver with text and/or graphical messages that relate to vehicle control strategies in accordance with embodiments of the present invention. With regard to embodiments of the present invention, the instrument cluster/message center 230 can receive vehicle control strategy status information and display (and/or audibly output) such status information. Examples of such status information include, but are not limited to, status of the secure idle mode activation, information relating to engine cycling functionality, information relating to an unauthorized attempt to drive the vehicle while in the secure idle mode, information relating to battery voltage level, information relating to vehicle fuel level, etc. The instrument cluster/message center 230 can also provide fuel level information (i.e., a engine cycling parameter) to the main control module 210 for enabling a determination to be made it engine cycling is permitted (i.e., it sufficient fuel is available to implement an instance of engine cycling).

The battery 232 can provide state of charge information (e.g., voltage level signal) to the main control module 210. With this information, the main control module 210 can implement actions necessary for attempting to maintain a satisfactory state of charge. For example, the main control module 210 can cause engine cycling to be implemented, can cause battery load shedding to be implemented, etc.

All or a portion of the various sensor and switches of the information processing system 205 each provide at respective signal to the main control module 210. The respective signal of all of a portion of the sensor and switches can be used for determining presence of an occupant within the vehicle. Such occupant determination can trigger a driver access code read request (e.g., to determine if the occupant is able to provide the drive access code). With regard to the start/stop switch 234, a signal therefrom commanding stop functionality will cause the vehicle to be transitioned from a motive-enabled state to a motive disabled state and indicate that the driver is present in the vehicle. With regard to the driver's door switch 235, its signal (i.e., indicating that the door is in an open position) can provide the main control module 210 an indication of whether the driver's door has been opened and the duration of time for which is was open. With regard to the transmission shifter position sensor 240, its signal (i.e., indicating that the transmission is in a particular gear position) can be used by the main control module 210 for enabling the secure idle mode to be activated (e.g., only if the transmission is indicated as being in park or neutral) and/or if an attempt is being made to drive the vehicle once in the secure idle mode. With regard to the accelerator pedal position sensor 242, its signal (i.e., indicating that the accelerator pedal is being depressed) can be used by the main control module 210 for enabling the secure idle mode to be activated and/or if an attempt is being made to drive the vehicle once in the secure idle mode. Furthermore, use of the accelerator pedal sensor signal can be used to inhibit the vehicle 200 from entering the secure idle mode if the pedal is depressed and will force a driver access code read request to terminate the secure idle mode if already in the secure idle mode. With regard to the steering input sensor 245, its signal (i.e., indicating that the steering wheel is being turned) can be used by the main control module 210 for enabling, the secure idle mode to be activated and/or if an attempt is being made to drive the vehicle once in the secure idle mode. With regard to the driver seat pressure sensor 250, its signal (i.e., indicating that a person is sitting in the driver seat) can be used by the main control module 210 for enabling the secure idle mode to be activated and/or if an attempt is being made to drive the vehicle once in the secure idle mode. With regard to the driver seatbelt deployment sensor 255, its signal (i.e., indicating that a person has extended the seatbelt) can be used by the main control module 210 for enabling the secure idle mode to be activated and/or if an attempt is being made to drive the vehicle once in the secure idle mode. With regard to the brake pedal position sensor 260, its signal (i.e., indicating that a person is depressing the brake pedal) can be used by the main control module 210 for enabling the secure idle mode to be activated and/or if an attempt is being made to drive the vehicle one in the secure idle mode.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle having an information processing system, the vehicle information processing system comprising:
    a first control module structure configured for determining a current motive mode of the vehicle;
    a second control module structure configured for determining if a driver is present in the vehicle, determining information indicating that the driver of the vehicle has left the vehicle unattended while the vehicle is in a motive-enabled mode upon determining the driver is not present in the vehicle and attempting to receive and authenticate a driver access code;
    a third control module structure configured for causing a secure idle mode to be implemented as a function of determining said information indicating that the driver of the vehicle has left the vehicle unattended while the vehicle is in the motive-enabled mode.

2. The vehicle information processing system of claim 1, wherein the third module control structure configured for changing the vehicle to the secure idle mode includes inhibiting the vehicle from being driveable until a driver access code is successfully received and authenticated by the vehicle.

3. The vehicle information processing system of claim 1, wherein the second control module structure configured for determining if the driver is present in the vehicle includes:
    determining if the vehicle is stationary;
    determining if a driver door has been open for at least a defined period of time; and
    determining if input has been detected by at least one driver input device of the vehicle.

4. The vehicle information processing system of claim 3, wherein the third control module structure configured for changing the vehicle to the secure idle mode includes inhibiting the vehicle from being driveable until a driver access code is successfully received and authenticated by the vehicle.

5. The vehicle information processing system of claim 1, further comprising: a fourth control module structure configured for shutting down operation of the vehicle after a vehicle shut-down delay period of time has elapsed since changing the vehicle to the secure idle mode.

6. The vehicle information processing system of claim 5, wherein the third control module structure configured for changing the vehicle to the secure idle mode includes inhibiting the vehicle from being driveable until a driver access code is successfully received and authenticated by the vehicle.

* * * * *